(12) United States Patent
Su et al.

(10) Patent No.: US 11,835,077 B2
(45) Date of Patent: Dec. 5, 2023

(54) SCREW

(71) Applicant: TAIWAN SHAN YIN INTERNATIONAL CO., LTD., Kaohsiung (TW)

(72) Inventors: Kou-Tsair Su, Kaohsiung (TW); Chen-Long Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 247 days.

(21) Appl. No.: 17/399,396

(22) Filed: Aug. 11, 2021

(65) Prior Publication Data

US 2023/0047308 A1    Feb. 16, 2023

(51) Int. Cl.
| | | |
|---|---|---|
| *F16B 39/06* | (2006.01) | |
| *F16B 25/10* | (2006.01) | |
| *F16B 25/00* | (2006.01) | |
| *F16B 35/06* | (2006.01) | |

(52) U.S. Cl.
CPC ........ *F16B 25/103* (2013.01); *F16B 25/0063* (2013.01); *F16B 35/065* (2013.01)

(58) Field of Classification Search
CPC . F16B 25/0063; F16B 35/0063; F16B 25/103
USPC ........................................................ 411/399
See application file for complete search history.

(56) References Cited

U.S. PATENT DOCUMENTS

| | | | | |
|---|---|---|---|---|
| 493,585 | A * | 3/1893 | Herzberg | ............ F16B 25/0015 |
| 1,238,636 | A * | 8/1917 | Christofferson | ........ F16B 35/06 |
| | | | | 411/399 |
| 5,772,376 | A | 6/1998 | Konig | |
| 5,788,911 | A * | 8/1998 | Nomura | .............. B29C 45/4421 |
| | | | | 264/318 |
| 6,290,444 | B1 | 9/2001 | Dicke | |
| 2001/0038781 | A1 | 11/2001 | Mallet et al. | |
| 2006/0257229 | A1* | 11/2006 | Bucciferro | ............ F16B 35/065 |
| | | | | 411/187 |
| 2011/0064540 | A1* | 3/2011 | Walther | ................ F16B 35/065 |
| | | | | 411/399 |
| 2012/0183373 | A1* | 7/2012 | Harvey | ................. F16B 35/065 |
| | | | | 411/399 |

(Continued)

FOREIGN PATENT DOCUMENTS

| | | |
|---|---|---|
| DE | 3344048 A1 | 6/1984 |
| EP | 3067575 A1 | 9/2015 |
| EP | 3002468 A1 | 4/2016 |

*Primary Examiner* — Gary W Estremsky
(74) *Attorney, Agent, or Firm* — Rosenberg, Klein & Lee

(57) ABSTRACT

A screw includes a head having a top face and a conical bottom surface, a shank, and thread convolutions. A chip guiding channel is recessedly formed on the conical bottom surface. On the conical bottom surface are spirally disposed a cutting portion which has a plurality cutting units sequentially arranged in a spiral manner, thereby allowing the chip guiding channel to be surrounded by the cutting units along a spiral track. The spiral arrangement of the cutting units assists the head in cutting fibers of a workpiece which are wound around the head into small chips in a continuous and spiral severing manner to reduce drilling torque and resistance, and the spirally-defined chip guiding channel also facilitates a smooth removal of the chips, thereby allowing the head to fit level with a top surface of the workpiece and increasing a fastening effect.

8 Claims, 5 Drawing Sheets

(56) References Cited

U.S. PATENT DOCUMENTS

| | | | |
|---|---|---|---|
| 2013/0022426 A1* | 1/2013 | Wu | F16B 25/0015 |
| | | | 411/337 |
| 2015/0063947 A1* | 3/2015 | Huang | F16B 35/065 |
| | | | 411/393 |
| 2015/0184685 A1 | 7/2015 | Su et al. | |
| 2016/0290382 A1* | 10/2016 | Dill | F16B 35/06 |
| 2018/0080491 A1* | 3/2018 | Scheerer | F16B 35/065 |
| 2019/0301516 A1* | 10/2019 | Lucas | F16B 25/0057 |
| 2020/0056647 A1* | 2/2020 | Su | F16B 25/103 |
| 2021/0102571 A1* | 4/2021 | Hu | F16B 25/0015 |

* cited by examiner

SCREW

BACKGROUND OF THE INVENTION

1. Field of the Invention

This invention relates to a screw structure and relates particularly to a screw having a head capable of increasing the screwing efficiency.

2. Description of the Related Art

Referring to FIGS. 1 and 2, a conventional screw 1 includes a head 11, a shank 12 extending axially from the head 11, and a threaded portion 13 spirally disposed on the shank 12. The head 11 has a top face 111 and a conical bottom surface 112 extending from the top face 111 to the shank 12. Protruding from the conical bottom surface 112 are ribs 113 which are spaced from each other and serve to cut unbroken fibers wound around the head 11 and scrape off burrs left on a top edge of a cut hole 21 of a workpiece 2. Thereafter, the head 11 is drilled into the workpiece 2 to complete a screwing operation. However, fibers of the workpiece 2 are resilient, which renders the spaced apart ribs 113 unable to cut all of the fibers into small chips. Instead of being broken into chips by cutting, the fibers are merely pressed by the ribs 113. These unbroken fibers, however, keep winding around the head 11, and this situation causes an increase in the drilling torque and resistance and also causes the difficult removal of the chips. Furthermore, too many fibers and chips may accumulate inside the cut hole 21 easily and even spread to the top edge of the cut hole 21 excessively, so the operation of pressing chips and burrs downwards with the conical bottom surface 112 of the head 11 does not go smoothly, and the top face 111 of the head 11 cannot be completely level with the top edge of the cut hole 21. Cracks may also be incurred in the workpiece 2 because of the undue accumulation of the chips and fibers. Thus, the conventional screw 1 needs to be improved.

SUMMARY OF THE INVENTION

An object of this invention is to provide a screw having a head capable of severing and cutting fibers wound around the head into chips and providing a space sufficient to accommodate the chips and removing redundant chips, which reduces drilling torque and resistance, helps countersink the screw into a workpiece, and achieves a better fastening effect.

The screw of this invention includes a shank, a head having a top face and a bottom portion formed between the top face and the shank, and a plurality of thread convolutions spirally disposed on the shank. The bottom portion has a conical bottom surface on which a chip guiding channel is recessedly formed and a cutting portion is spirally disposed. The cutting portion has a plurality of cutting units located beside the chip guiding channel and sequentially arranged in a spiral manner. When the cutting units are spirally arranged to present a spiral track, the chip guiding channel is surrounded by the cutting units along the spiral track. The cutting units protrude outwards from two sides of the chip guiding channel. The outward protrusion of these cutting units defines cutting edges to achieve a spiral severing operation whereby unbroken fibers of a workpiece wound around the head are continuously and efficiently cut into small chips. The chip guiding channel is formed in a position lower than the cutting units because of the above outward protrusion to help accommodate part of the chips and also guide redundant chips out of the workpiece smoothly. This prevents burrs of the chips from being left on a top surface of the workpiece so that the head can fit level with the top surface of the workpiece efficiently for attaining a good countersinking effect, and a firm fastening effect can be achieved.

Preferably, in one preferred embodiment, each of the cutting units can be formed in a shape like a fin. It is also preferable that the cutting units are continuously connected one after another to facilitate a continuous cutting effect under the spiral arrangement as described above.

Preferably, in one preferred embodiment, an extension portion can be formed circumferentially at an outer edge of the top face. The extension portion extends in the direction of the bottom portion and defines a plurality of auxiliary edges spaced from each other to assist the head in engaging with the workpiece firmly. Meanwhile, it is also preferable that there are grooves cut into the extension portion and each provided with a first extension wall and a second extension wall. The first extension wall of one groove and the second extension wall of another adjacent groove converge at the auxiliary edge.

Preferably, in one preferred embodiment, each of the cutting units includes two wall surfaces which converge at the cutting edge to conduct the spiral severing operation.

DETAILED DESCRIPTION OF THE PREFERRED EMBODIMENTS

Figure 1:
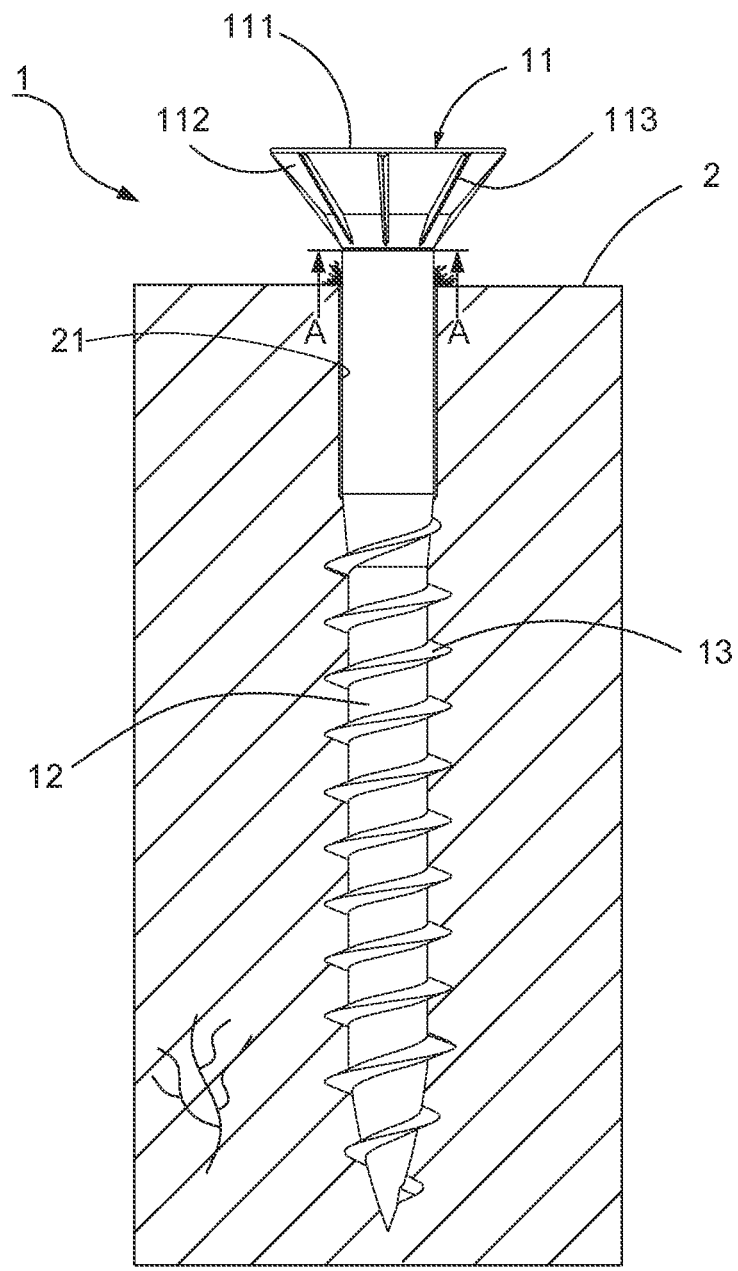
FIG. 1 is a schematic view showing a conventional screw.
Figure 2:
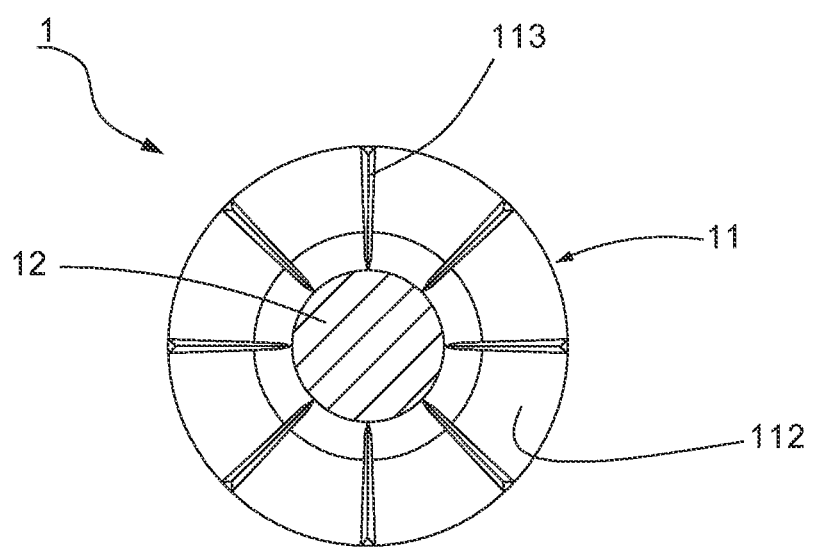
FIG. 2 is a cross-sectional view taken along A-A line of FIG. 1.
Figure 3:
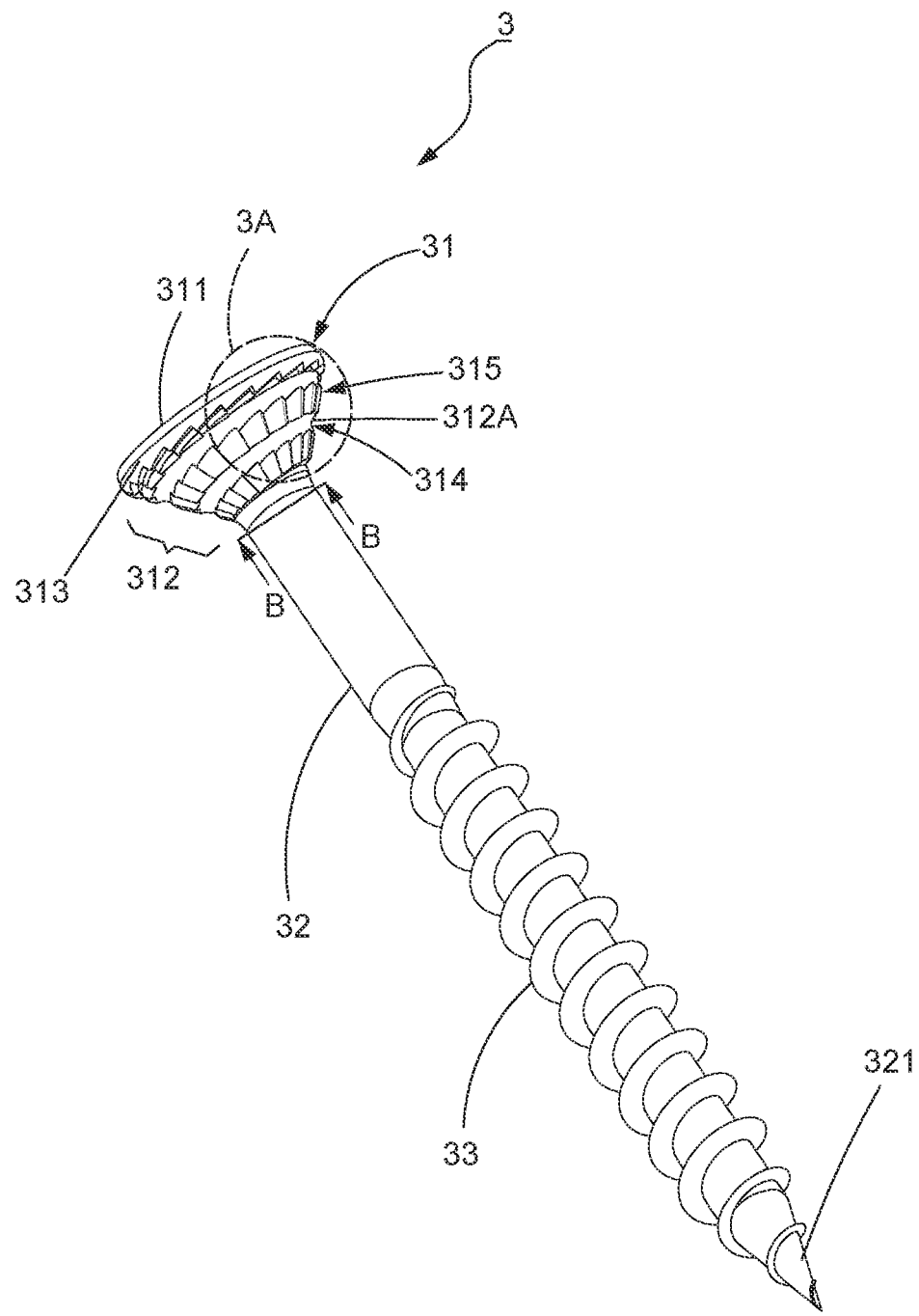
FIG. 3 is a schematic view showing a preferred embodiment of this invention.
Figure 4:
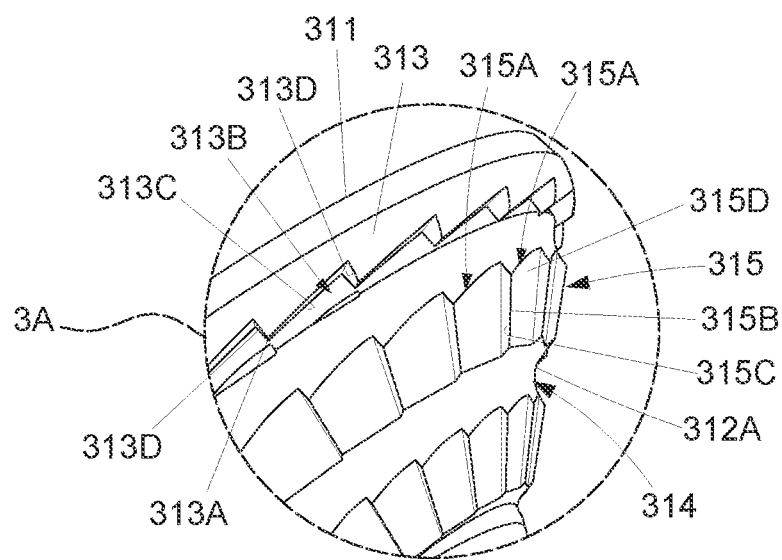
FIG. 4 is an enlarged view of the encircled portion 3A of FIG. 3.

Referring to FIGS. 3 and 4, a screw 3 of a preferred embodiment of this invention includes a head 31, a shank 32 connected to the head 31, and a plurality of thread convolutions 33 spirally disposed on the shank 33. The shank 32 has a drilling portion 321 in opposing relationship to the head 31. The drilling portion 321 can include a sharp tip as shown in the figures or a drill body having one groove or opposing grooves.

The head 31 has a top face 311 and a bottom portion 312 formed between the top face 311 and the shank 32. As shown in the figures, the bottom portion 312 extends from the top face 311 to the shank 32. The bottom portion 312 has a bottom surface, and the bottom surface is substantially conical in shape to become as a conical bottom surface 312A. The head 31 also has a chip guiding channel 314 recessedly formed on the conical bottom surface 312A and a cutting portion 315 spirally disposed on the conical bottom surface 312A.

Figure 5:
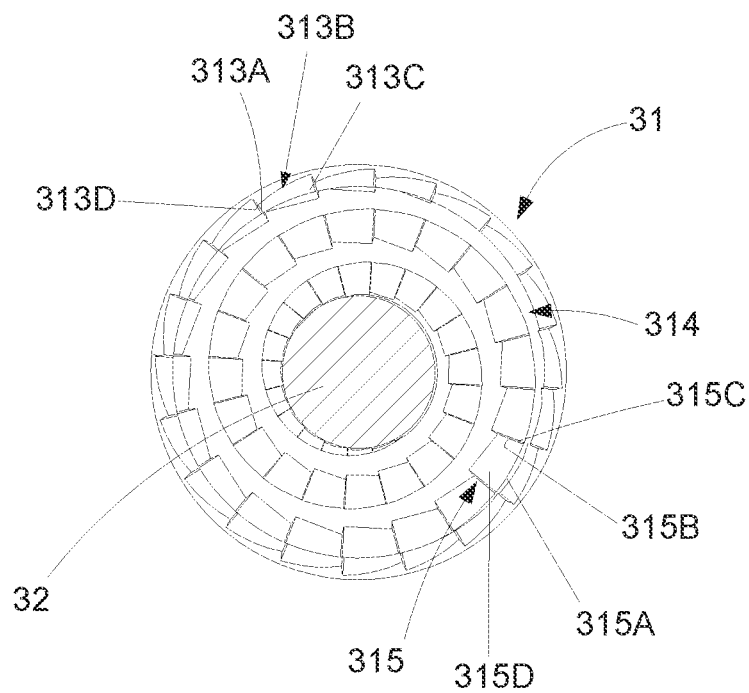
FIG. 5 is a cross-sectional view taken along B-B line of FIG. 3.
Figure 6:
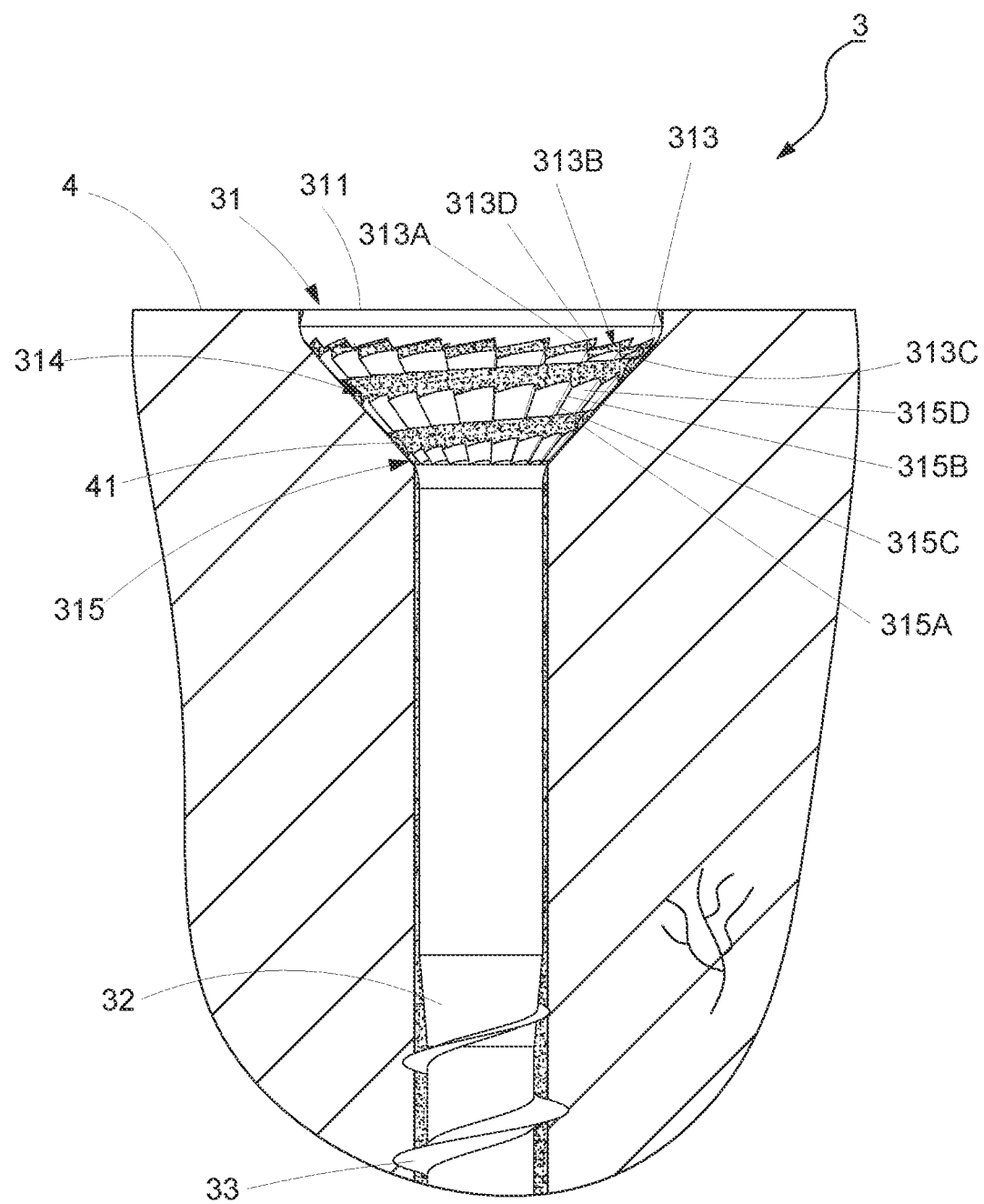
FIG. 6 is a schematic view showing that the preferred embodiment of this invention is fastened in position.

The cutting portion 315 has a plurality of cutting units 315A located beside the chip guiding channel 314. The cutting units 315A can be continuously connected one after another as shown in FIG. 3 or spaced from each other, but at all events the cutting units 315 are sequentially arranged in a spiral manner, as shown in FIG. 5 in which the chip guiding channel 314 is spirally formed between the cutting portion 315 because of the spiral arrangement of the cutting units 315A. Specifically, the cutting units 315A are arranged in sequence, and the arrangement winds around a specific point of the conical bottom surface 312A and recedes gradually from the point to form a spiral arrangement whereby a spiral track is defined. According to the spiral arrangement of the cutting units 315A, the chip guiding channel 314 can be formed between the cutting portion 315, i.e. surrounded by the cutting units 315A along the spiral track. Therefore, the chip guiding channel 314 is also spirally formed to become a spiral channel. Furthermore, the cutting units 315A, as shown in FIG. 4, protrude outwards from two sides of the chip guiding channel 314 so that the chip guiding channel 314 is defined in a low position, i.e. in a position lower than the cutting units 315A. In the preferred embodiment, the chip guiding channel 314, as for example shown in FIG. 4, can be curved inwards to be recessed into the conical bottom surface 312A so that the channel 314 provides a deeper bottom.

When each of the cutting units 315A protrudes outwards, a cutting edge 315B is defined. In the preferred embodiment, the cutting unit 315A can, but not limited to, be shaped like a fin structure, e.g. a fish fin, and it is shown that the cutting unit 315A includes a first wall surface 315C and a second wall surface 315D connected to the first wall surface 315C, and the cutting edge 315B is defined along a junction of the first wall surface 315C and the second wall surface 315D. In other words, the two wall surface 315C, 315D converge to define the cutting edge 315B. Both wall surfaces 315C, 315D can, but not limited to, be flat, inclined, and curved. The cutting edges 315B can point in a direction corresponding to a screwing direction of the screw 3 or in a direction opposite to the screwing direction.

In the preferred embodiment, an extension portion 313 can be formed circumferentially at an outer edge of the top face 311 and extend towards the bottom portion 312. The extension portion 313 defines a plurality of auxiliary edges 313A spaced from each other. Particularly, there can be a plurality of grooves 313B cut into the extension portion 313. Each of the grooves 313B is enclosed by a first extension wall 313C and a second extension wall 313D, and each auxiliary edge 313A is defined along a junction of the extension walls 313C, 313D. In other words, the first extension wall 313C of one groove 313B and the second extension wall 313D of another adjacent groove 313B converge to define the auxiliary edge 313A. In addition, the first extension wall 313C can, but not limited to, be a sloping wall, and the second extension wall 313D can, but no limited to, be a vertical wall. The auxiliary edges 313A can point in a direction corresponding to or opposite to the screwing direction of the screw 3.

The operation of this invention is described with the aid of FIGS. 3 to 6. When the drilling portion 321 of the screw 3 comes into contact with a top surface of a workpiece 4, a driving tool (not shown) adds driving force to rotate the head 31 in a screwing direction. The rotation of the head 31 allows the drilling portion 321 and the thread convolutions 33 to be gradually drilled into the workpiece 4, and a hole 41 is formed during the drilling action. During the drilling action, the thread convolutions 33 cut fibers of the workpiece 4 wound around the shank 32 so that the shank 32 is gradually screwed into the workpiece 4 to conduct a screwing operation. When the bottom portion 312 is in contact with the workpiece 4, the spiral arrangement of the cutting units 315A starts a continuous, sharp, and spiral severing operation. Specifically, when the fibers cut by the thread convolutions 33 are not fully broken and begin to wind around the head 31, the first wall surfaces 315C add pushing force to unbroken fibers and then the cutting edges 315B sever the fibers immediately and continuously so that the unbroken fibers are quickly cut into small chips. The chips travel through the second wall surfaces 315D and enter the chip guiding channel 314. Then, some chips run from the chip guiding channel 314 toward the top face 311 and are finally guided out of the head 31.

It is noted that when the cutting edges 315B are spirally arranged on the conical bottom surface 312A, the spiral arrangement enhances the cutting ability so that the fibers are incessantly severed in a spiral manner during the screwing operation, and concurrently the hole 41 is smoothly enlarged to achieve a quick reaming effect. The severing effect prevents the fibers from winding around the head 31 excessively, which helps a decrease in the drilling torque and resistance. Meanwhile, the chip guiding channel 314 which is in a lower position provides a space sufficient to accommodate part of the chips for achieving a firm engagement between the head 31 and the workpiece 4, and redundant chips travel along the spirally-formed chip guiding channel 314 and then move towards the top face 311 so that the redundant chips are smoothly guided out of the screw 3 for quick removal and preventing the workpiece 4 from cracking. In other words, cracks of the workpiece 4 caused by the undue accumulation of the chips inside the hole 41 can be prevented.

In addition, when the grooves 313B of the extension portion 313 are located between the chip guiding channel 314 and the top face 311, the chips can be smoothly discharged through the chip guiding channel 314 and then the grooves 313B for achieving the quick removal. Sufficient chips can also be accommodated within the chip guiding channel 314 and the grooves 313B so that a firm engagement between the head 31 and the workpiece 31 is promoted, and the generation of cracks in the workpiece 4 is also prevented. It is also noted that the first extension walls 313C and the second extension walls 313D of the grooves 313B cooperate to assist the extension portion 313 in pressing the chips downwards and blocking burrs, which prevents the chips from projecting from the head 31 and blocks the movement of burrs caused by the projecting chips to prevent the undue accumulation of the burrs from being left on the top surface of the workpiece 4. When the extension walls 313C, 313D cooperate to add the pressing force to the chips, the auxiliary edges 313A engage with an inner wall of the hole 41 to promote the firm engagement.

According to the concatenation of the above elements such as the chip guiding channel 314, the cutting portion 315, and the grooves 313B, the head 31 can be fastened to the workpiece 4 more firmly to increases the fastening effect of the screw 3 after the screwing operation is complete, and concurrently the top face 311 of the head 31 and the top surface of the workpiece 4 can be exactly at the same level to maintain good surface flatness or evenness.

To sum up, the screw of this invention takes advantages of a spirally-arranged cutting portion and a spiral chip guiding channel recessedly defined on the conical bottom surface of the head and between the cutting portion to not only sever fibers in a continuous and spiral cutting manner for a reduction in drilling torque and resistance but also facilitate the accommodation of sufficient chips and the quick removal of redundant chips. The extension portion also provides auxiliary edges serving to press the chips downwards and grooves serving to remove and accommodate chips. Therefore, a firm and stable engagement between the head and the workpiece is achieved to help an increase in the fastening effect, and concurrently the head is allowed to fit level with the workpiece for attaining a good countersinking effect.

While the embodiments are shown and described above, it is understood that further variations and modifications may be made without departing from the scope of this invention.

What is claimed is:

1. A screw comprising a head, a shank connected to said head, and a plurality of thread convolutions spirally disposed on said shank, said head having a top face and a bottom portion extending from said top face to said shank, said bottom portion having a conical bottom surface;

wherein said head includes a chip guiding channel recessedly formed in said conical bottom surface and a cutting portion disposed on said conical bottom surface in a continuous spiral pattern winding around said shank between said shank and said top face, said cutting portion having a plurality of cutting units located alongside said chip guiding channel and sequentially arranged in said continuous spiral pattern, and said chip guiding channel thereby being bounded on opposing sides by said cutting units along a spiral track disposed in correspondence with said continuous spiral pattern of said cutting units, said cutting units protruding outwardly from two sides of said chip guiding channel, and said chip guiding channel thereby being disposed in a position lower than said cutting units, each of said cutting units protruding outwardly to define a cutting edge.

2. The screw according to claim 1, wherein said cutting units are each formed with a contour of a fin.

3. The screw according to claim 1, wherein said cutting units are contiguously connected one after another.

4. The screw according to claim 1, wherein an extension portion is formed circumferentially at an outer edge of said top face and extends in the direction of said bottom portion, said extension portion defining a plurality of auxiliary edges spaced from each other.

5. The screw according to claim 4, wherein a plurality of grooves are cut into said extension portion, each of said grooves being enclosed by a first extension wall and a second extension wall, each of said auxiliary edges being defined along a junction of said first extension wall of one groove and said second extension wall of another adjacent groove.

6. The screw according to claim 1, wherein each of said cutting units includes a first wall surface and a second wall surface connected to said first wall surface, said cutting edge being defined along a junction of said first wall surface and said second wall surface.

7. The screw according to claim 1, wherein said spiral track of said chip guiding channel winds unidirectionally around said shank.

8. A screw comprising a head, a shank connected to said head, and a plurality of thread convolutions spirally disposed on said shank, said head having a top face and a bottom portion extending from said top face to said shank, said bottom portion having a conical bottom surface;

wherein said head is formed with a recessed chip guiding channel formed in said conical bottom surface and a cutting portion disposed on said conical bottom surface in a single continuous spiral pattern winding around said shank between said shank and said top face, said cutting portion having a plurality of cutting units located adjacent said chip guiding channel and sequentially and contiguously arranged in said single continuous spiral pattern, and said chip guiding channel unidirectionally winding around said shank in a continuous spiral track disposed in correspondence with said single continuous spiral pattern of said cutting units, said cutting units protruding outwardly from two sides of said chip guiding channel, and said chip guiding channel thereby being disposed in a position lower than said cutting units, each of said cutting units protruding outwardly to define a cutting edge.

* * * * *